United States Patent [19]

Kaufman

[11] Patent Number: 4,635,828

[45] Date of Patent: Jan. 13, 1987

[54] LIQUID CONTAINER DISPENSING CAP STRUCTURE

[76] Inventor: John G. Kaufman, 858 Condor Drive, Burlington, Ontario, Canada, L7T3A7

[21] Appl. No.: 625,363

[22] Filed: Jun. 27, 1984

[51] Int. Cl.⁴ .......................................... B65D 37/00
[52] U.S. Cl. .................... 222/185; 222/212; 222/519; 222/571
[58] Field of Search ............... 222/207, 209, 211, 457, 222/454, 185, 173, 205, 212, 424.5, 206, 215, 214, 184, 519, 548, 571; 128/360

[56] References Cited

U.S. PATENT DOCUMENTS 2,680,477  6/1954  Schira, Jr. .................. 222/209 X
4,324,349  4/1982  Kaufman .................... 222/215 X
4,420,098  12/1983  Bennett ....................... 222/209 X
4,516,697  5/1985  Dreps et al. ................. 222/212

Primary Examiner—Joseph J. Rolla
Assistant Examiner—Michael S. Huppert
Attorney, Agent, or Firm—Hirons, Rogers & Scott

[57] ABSTRACT

A liquid dispenser is described which comprises a substantially airtight container for storing liquid to be dispensed with the container being formed with a downwardly-extending, constricted liquid passageway and a cap member with an open top in liquid-sealed engagement with the lower end of the container to define a chamber within the cap member and surrounding the liquid passageway, the cap member having an outlet positioned above the lower end of the liquid passageway in the chamber such that when an increase of pressure is established within the container liquid is expelled through the outlet.

12 Claims, 17 Drawing Figures

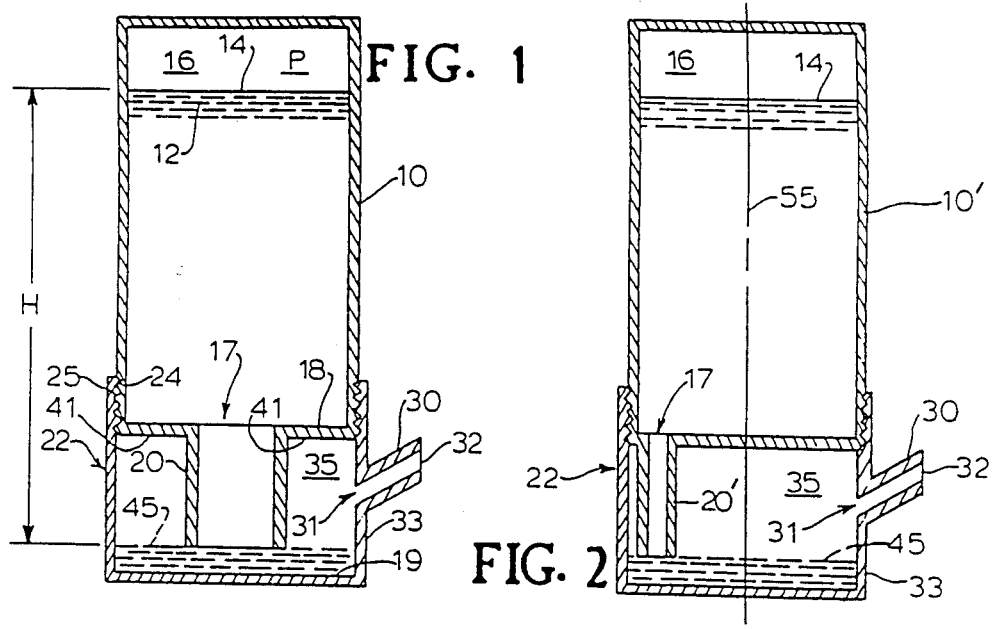
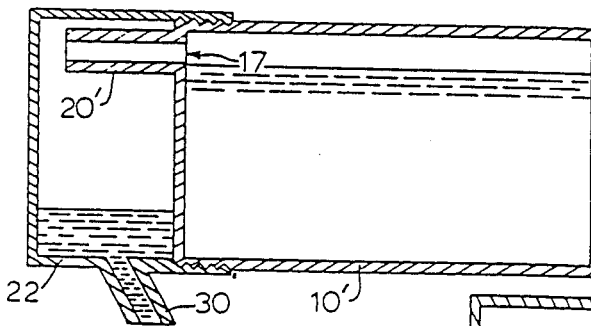
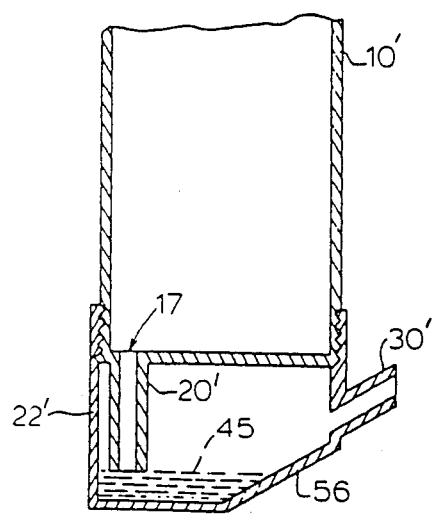
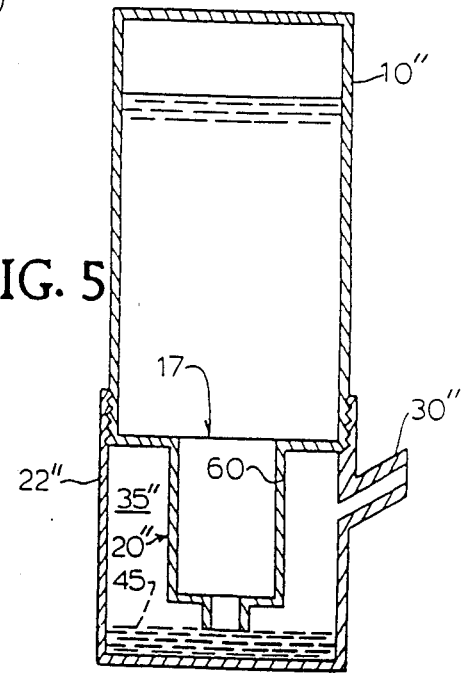

LIQUID CONTAINER DISPENSING CAP STRUCTURE

DESCRIPTION

1. Technical Field

The invention relates to liquid containers and particularly to squeeze-type containers having means to dispense the liquid product when squeezed.

2. Background Art

Applicant's own U.S. Pat. No. 4,324,249 which is presently the subject of a reissue application filed Apr. 4, 1984, Ser. No. 596,522, is believed to represent the most pertinent art. This patent discloses a liquid dispenser comprising a squeeze bottle with an opening formed in the underside of the squeeze bottle, an airtight chamber defining an air pocket in an upper portion of the chamber, a liquid passageway connecting a lower portion of the chamber with the interior of the bottle and a liquid outlet connecting the air pocket and the upper portion of the chamber to the external atmosphere. An auxiliary dispensing structure which forms the mentioned chamber and screws onto the bottle neck having the mentioned opening is illustrated in FIGS. 2 and 3 of the patent. However, in contrast to the present invention, the auxiliary dispensing structure of applicant's prior patent does not use the outer side wall surface of the lower end of the bottle or the neck as a portion of the wall structure forming the chamber. Furthermore, the mentioned liquid passageway of the patent, unlike the liquid passageway of the majority of the embodiments of the present invention, is not formed as part of the container and as a downwardly extending outlet depending from the container's lower end.

In other respects, the squeeze bottle structures of applicant's prior patent, while adaptable to a range of liquid viscosities, is best adapted to liquids of relatively low viscosity. Thus, it would be desirable to have a dispensing device in the form of a cap-like structure which can be fitted to the lower end of a squeeze bottle, or the like, to form a chamber, which can use the bottle's lower end side wall or neck as a portion of the chamber wall, which can be adapted to dispense liquids of relatively high viscosity, such as creams and ointments as well as low viscosity liquids such as detergents and in either case the chamber may be proportioned to compensate for room temperature changes so that the product is not inadvertently dispensed. In another respect, it would be desirable to locate the air pocket chamber completely externally of the bottle and to form the chamber at least in part using the relatively thin wall portions of the lower end or neck of the container from which the liquid is being dispensed in order to minimize use of material. In a further respect it would be desireable to be able to modify the dispensing cap and chamber to dispense a unit dose and also to be able to modify the position, length and size of the liquid passageway at minimal cost to provide a dispensing structure for use with different products.

Another squeeze-type container adapted to dispense from the bottom of the container is described in French Patent Application No. 7832818 (Publication No. 2442195) to De Sancy. This French publication discloses a deformable container for dispensing liquid, the container having a closure cap in threaded engagement with a neck of the container, an airtight cupola-shaped structure within the container and an outlet tube extending through the cap into the interior of the cupola-shaped structure, at least one opening being provided in the bottom of the latter to allow liquid in the container to flow into the cupola-shaped structure, the outlet tube extending from an air space above the liquid in the cupola-shaped structure. From the description given, it would appear that the dispensing structure described in the French reference would have relatively limited adaptability to operate without dripping in the event of wide temperature fluctuations and would also have limited application to a relatively wide viscosity range for the liquid products contained and dispensed. In any event, the French reference structure does not have a cap chamber forming structure and does not provide for the chamber and its air pocket to be disposed externally of the container from which liquid is being dispensed and of using a portion of the container's lower end outer wall as at least a portion of the wall forming the chamber.

French Pat. No. 1389996 to Formicola, published Jan. 11, 1965, teaches a dispensing device comprising a U-shaped tube mounted within an opening in the lower end of a flexible wall container. The French patent noticeably does not provide an air chamber mounted externally, below and communicating with the opening of a bottle having such opening at its lower end. The French patent does not teach or suggest providing a liquid passage communicating the lower portion of an air chamber with the interior of a bottle and a liquid outlet communicating the upper portion of such chamber with the exterior.

U.S. Pat. No. 3,157,319 to Schwienbacher discloses another bottom dispensing device for dispensing an easily dripping liquid. The Schwienbacher device comprises a resiliently deformable container with a discharge opening arranged in the bottom of the container, an internally-mounted hood associated with the bottom of the container, with an opening for allowing liquid in the interior of the container to flow past the bottom of the hood into the interior of the hood, and an outlet tube extending from an air space in the hood through the bottom of the container.

French Pat. No. 2,442,195 to Roussey, published June 20, 1980, like the Schwienbacher reference, discloses another bottom dispensing device mounted internally of a flexible wall container. The dispensing apparatus is formed in part by a cap threadably connected to the threaded neck of the bottle.

U.S. Pat. Re. Nos. 13,551 and 1,349,703 each teach a wick dispensing device for a liquid container in which an auxiliary chamber having a plurality of holes open to atmosphere such that no air pocket is established is secured to the lower end of a noncompressible container. The open-to-atmosphere chamber illustrated in these last-mentioned references is formed in part by the container wall at the lower end of the container and assists in dispensing a liquid and the container used is formed with a downwardly extending, outlet that extends from the container into a body of liquid held by the chamber. Unlike the present invention, however, there is not provided within the chamber an air pocket closed to atmosphere except for a single outlet above the level of liquid in the chamber. Since the last-mentioned United States patents operate with containers which are made of glass or other noncompressible material, the wick dispensing mechanisms do not adapt to the squeeze-type bottle dispensing mode of operation, exhibit no temperature compensation as with the present invention and do not adapt to a wide range of liquids of different viscosity.

U.S. Pat. No. 2,311,367 is mentioned primarily as a background reference. This patent teaches a dispensing structure mounted on top of a container in the form of a suction bulb.

Applicant's own copending application Ser. No. 482,776, filed Apr. 7, 1983, entitled "Dispensing Container for Liquid Products" provides additional background art and teaches a type of dispenser in which the outlet is provided through a side wall of the container in order to enable the discharge or outflow of the liquid, or in some cases the vapor of the liquid, to take place from the chamber through the side wall of the container.

Taking applicant's prior U.S. Pat. No. 4,324,349 and all other prior art known to applicant into account, the art has not provided an auxiliary cap-like structure for mounting on the lower end of a compressible-type liquid container and which uses a portion of the lower end of the container wall itself or the container neck as a means for forming an air chamber located externally of the container and with an air pocket in an upper portion of the chamber, a liquid passageway depending downwardly from and forming part of the container itself and providing communication between a lower portion of the chamber and the interior of the bottle and a liquid outlet forming part of the cap structure located above the lower end opening of the liquid passageway for connecting the air pocket to the external atmosphere. Thus, the present invention is intended to provide even further improvements over the dispensing apparatus taught by applicants prior U.S. Pat. No. 4,324,349, over the dispensing apparatus taught by applicant's copending application Ser. No. 482,776 and over all prior art known to applicant by providing an auxiliary cap-like liquid dispensing structure adapted to use the lower end outer wall or neck of the container as part of a chamber-forming dispensing device, to permit a wide range of viscosities to be used, to provide temperature compensation, and to facilitate emptying all of the contents as well as to unit dispensing.

DISCLOSURE OF INVENTION

The present invention is based on an appreciation of the fact that, in a flexible, typically thin wall liquid container having a structure defining a chamber externally of the container and a chamber outlet providing communication between an airspace in the chamber and the exterior of the container, it is possible when the container itself is formed with an opening at the bottom of the container and a downwardly extending, passageway outlet to utilize the outer side wall or neck of the container at its lower end as part of the chamber by forming the mentioned structure in the nature of a cap which can be snap-fitted, screwed on, press-fitted, or otherwise connected in a liquid-tight relation to a mating fitting or surface on the container around the opening.

Thus, for example, in the packaging of liquid consumer products, for example, liquid soap, the invention recognizes that it is in some cases advantageous to provide a squeeze container with a threaded connection formed above a downwardly protruding outlet such that a cap-like chamber forming structure can be easily secured to the threaded connection and thereby establish a dispensing apparatus utilizing part of the outer wall of the container or neck at its lower end as part of the chamber wall and the container outlet as a liquid passageway communicating between the interior of the container and the bottom of the chamber.

DESCRIPTION OF THE DRAWINGS

The drawings illustrate various forms of the invention dispenser in which in all such forms a portion of the outer wall surface of the lower end or neck of a container or bottle having a downwardly extending outlet is utilized to form an air pocket chamber. Making more specific reference to the drawings:

FIG. 1 is a vertical sectional view of a generally cylindrical-shaped compressible container having a downwardly-extending, centrally-located, outlet associated with a screwed-on, chamber-forming, generally cylindrical-shaped dispensing cap structure according to the first embodiment of the invention.

FIG. 2 is a view similar to FIG. 1 in which the container outlet is narrower and positioned closed to one side of the container to provide unit dose dispensing.

FIG. 3 illustrates the compressible container and discharge means of FIG. 2 turned on its side for dispensing a single unit dose.

FIG. 4 is a fragmentary view of part of a compressible container and discharge means similar to FIG. 2 but with a portion of the cap structure chamber wall below the chamber outlet sloped to facilitate complete emptying of the container.

FIG. 5 in a view similar to FIG. 1 illustrates the container with a longer and wider neck and with a correspondingly relatively deep, chamber-forming cap structure.

BEST MODE FOR CARRYING OUT THE INVENTION

Figure 6:
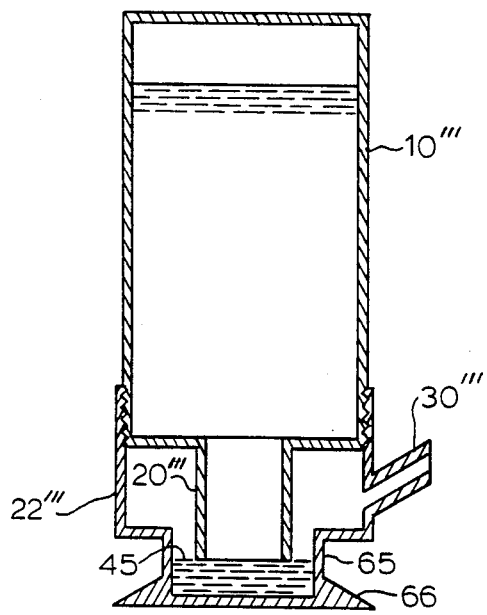
FIG. 6 illustrates the container of FIG. 1 with a different chamber-forming cap structure having a well located immediately below the centrally-located container outlet to facilitate emptying of the container.

With reference to FIG. 1 there is diagrammatically illustrated a resilient, flexible walled, generally cylindrical-shaped container 10 in the body of which is a liquid 12 extending up to a level 14 and defining an airspace 16 with a partial vacuum P above the liquid level 14. Protruding downwardly from a centrally-located opening 17 in the bottom wall 18 of container 10 and sealed thereto is a correspondingly centrally-located bottle outlet passageway or neck in the form of a downwardly extending constricted conduit 20. By "constricted" as used here it is meant that the size of the passageway is substantially less than the internal cross-sectional area or size of the container. When the container and passageway are both cylindrical, for example, the inside diameter of the passageway would be substantially less than the inside diameter of the container. An air pocket chamber forming dispensing structure in the form of an inverter cylindrical cap 22 is provided externally of the body of container 10. Cap 22 is secured in liquid tight relation to the container 10 by engagement of threads 24 formed on the lower end and outer periphery of container 10 with mating threads 25 on the inner upper periphery of cap 22. The container interior body therefore is substantially sealed apart from the outlet conduit 20. When liquid contained in container 10 is not being dispensed and the container is disposed as shown in FIG. 1 with the outlet conduit or neck 20 extending downwardly therefrom, an air pocket 35, defined by the inner surfaces of cap 22, the container lower end outer wall surface 14 and the outer surface of outlet 20, is formed within and in the upper portion of cap 22. Air pocket 35 communicates with the outside atmosphere through the chamber outlet conduit 30 and hence is at outside atmospheric pressure when liquid is not being dispensed. Conduit 30 is formed integral with cap 22 and its length is defined by an opening 31 within the cap and and opening 32 open to atmosphere. Except for the outlet conduit 30 communicating with the atmosphere and the conduit 20 communicating with the liquid in container 10, the chamber formed by cap 22 is otherwise closed by mating threads 24, 25 forming a liquid and air-tight seal.

Of particular significance is the fact that the air pocket 35 is established at least in part by the outer wall surface 41 on the lower end of container 10. Thus, the container bottom wall 18 itself is used as a portion of the chamberforming structure. In the FIG. 1 position shown, liquid enters the cap 22 to a level 45, leaving air in the air pocket 35 in cap 22. Level 45, used throughout the drawings to indicate a representative nondispensing level, is determined by the general configuration of the dispensing structure as well as by the viscosity of the liquid and by the partial vacuum above the main body of liquid in container 10. In this manner, the container 10 and its contents can be stored in the position shown. Liquid will not escape or drip from the chamber outlet conduit 30 while the container is thus left undisturbed and while accomodating to substantial temperature variation within the limitations of the particular cap configuration to avoid inadvertent dispensing. A cap on outlet conduit 30 can be employed but is not necessary.

In order to discharge liquid from the container 10 through the openings 31, 32 of chamber outlet conduit 30, the pressure P in the space 16 at partial vacuum above the liquid level must be increased and since container 10 is a resiliently-sided, flexible bottle, this pressure increase can be achieved merely by squeezing. When this occurs, liquid level 14 tends to change and liquid level 45 in the cap structure 22 tends to rise. Air in the air pocket 35 is forced out through opening 32. As the pressure P increases, level 14 eventually falls and level 45 eventually rises to the level of opening 31 in outlet conduit 30 and liquid starts to discharge from opening 32 upon reaching the level of this opening. The exit port or opening 32 is preferably spaced outwardly from sidewall 33 of cap structure 22. A residual amount of air above the level of opening 31 will be trapped in the air pocket 35.

When pressure in space 16 is relieved, e.g., by releasing the squeeze on the bottle, pressure P will be less than outside, atmospheric pressure, and consequently air will be driven by the pressure differential through conduit 30, through the air pocket 35, to return liquid from the chamber to the container and then to bubble up through the liquid 12 to restore equilibrium conditions. The return of air through opening 31 of chamber outlet 30, occuring substantially immediately after discharge of liquid therethrough, has the effect of cleaning liquid residues from the interior surface of the conduit 30 to maintain it in a substantially clean condition between dispensing operations. The use of a closure cap, except for shipping purposes, is thus rendered unnecessary. Upward sloping of outlet conduit 30 as in FIG. 1 also helps eliminate any tendency to drip by allowing viscous liquid to flow back into air pocket 35.

The amount of liquid to be discharged through conduit 20 of a given structure as shown is proportional to the increase in pressure P in space 16. In equilibrium, the apparatus functions according to the general equation: $H \times sg + P =$ atmospheric pressure where H represents the difference in level between liquid level 14 in the main body of the container and liquid level 45 in the air pocket structure, P represents the pressure in the gas space above the liquid level 14, and sg represents the specific gravity of the liquid. It can thus be seen that any increase in pressure P above the liquid level 14 will cause an imbalance and the liquid will be moved to decrease H, the liquid head. Increase in pressure P thus causes a corresponding loss of liquid through the exit port or opening 32 in chamber discharge outlet conduit 30, resulting in a new level of H. The amount of discharged liquid depends upon the amount of pressure applied above the liquid level 14, the time this pressure is maintained, and the viscosity of the liquid. Upon release of the applied pressure, e.g., by relaxation of the squeeze P bottle decreases and, air is drawn in through opening 32 of conduit 30 to restore the equation for a new pressure P and corresponding height H. to In this way, the amount of liquid discharged is determined in part by the pressure applied to the space above the liquid. Such pressure change in alternative arrangements could be accomplished by other means for increasing pressure to expel the liquid and suckback to restore the liquid to its normal storage level. Such means could be by mechanically compressing the container wall, use of a plunger or bellows arrangement within or connected to the container or by heating or using other means to expand the air or other gas confined above the liquid in the container.

The use of the air pocket structure in accordance with the present invention ensures that the liquid is maintained within the container while the container is at rest, and that there is no risk of dripping or other leakage of the contents through the opening 32 of chamber conduit 30. The liquid level 45 in a nondispensing mode is well below the level of the entrance 31 to the outlet 30 so that dripping and leakage are avoided while maintaining a desired degree of temperature compensation. The size of the air pocket portion 35 in conjunction with the liquid viscosity determines the amount of temperature compensation that can be provided. Thus, the size of the air pocket 35 is designed to prevent inadvertent leakage of liquid over a predetermined temperature range for each product.

With the structure according to the invention, there must be a certain, finite increase in pressure P above the liquid level 14 before liquid is expelled from the container through conduit 20 so as to cause a sufficient rise of liquid in the air pocket 35 for dispensing. As a consequence, a cap-like chamber forming dispensing device according to the present invention is not only simple in construction and economical to manufacture but is eminently suitable for environments of variable temperatures. An example is the use for containing soaps, shampoos, cosmetics, and the like, in a personal bathroom or shower closet. A squeeze bottle equipped with a cap outlet, e.g. outlet 30, as described herein can be mounted on the wall of the shower closet with the cap outlet extending downwardly rather than upwardly as in FIG. 1 and can contain shampoo, for example. When the shower closet is in use, the shower closet temperature may rise considerably, with consequent increase in pressure P within the bottle. This will cause the liquid level 45 in the air pocket 35 to rise, but no liquid will issue from the exit port or opening 32 in the outlet conduit 30 until there has been a sufficient increase in pressure P to raise the liquid level 45 to the level of the exit port 32 in the outlet conduit 30 according to the aforementioned equation. By suitable adjustment of the depth of the chamber formed by the structure of cap 22, and positioning of of the entrance 31 relative to the outlet conduit 30, the device can be arranged to withstand a selected range of temperatures without leakage, and without requiring the use of a capped, discharge conduit. While an upwardly-sloped outlet as in FIG. 1 is generally preferred a short downwardly-sloping outlet for shampoo dispensing is deemed acceptable because the suck back is such that dripping is unlikely provided of course that the user releases the container quickly.

With continuing reference to FIG. 1, it has been found desirable that the total volume of air-liquid space established by cap 22 between the opening 31 and a cap bottom wall 19 be sufficient such that when container 10 is approximately three-fourths empty, liquid level 45 can accommodate a 30° F. to 40° F. variation without causing liquid to be expelled from the exit port 32 of conduit 30. Temperature compensation is decreased when the internal diameter of the container outlet or passageway 20 is increased because the volume of air pocket 35 is then decreased (all other dimensions being unchanged). While it is also desirable that the container or bottle 10 have a resilient wall, it is also noted as being desirable that the particular plastic or other material used to form the container 10 should preferably allow the depressed wall of container 10 after dispensing and when expanding to move slowly and linearly for medium and high viscosity liquids to establish good suck back through conduit 30. Cap 22, unlike container 10, can be molded of a substantially rigid or relatively-stiff material when adapted for a threaded fit (FIG. 1) connection to container 10 or can be made of a slightly resilient material when using a press-fit (FIG. 16) or snap-fit (FIG. 13) type connection.

FIGS. 2 and 3 represent constructions similar to FIG. 1 with the exception that the bottle outlet 20' is narrower and laterally offset from the centerline 55 of container 10' such that when the modified container 10' is tipped on its side as shown in FIG. 3, the bottle can be squeezed to dispense a unit measure of shampoo, medicine, or the like, through outlet conduit 30'. The size and length of outlet 20, the amount of liquid stored in cap 22 and the unit-dose volume may of course vary with the application and with the viscosity of the liquid being dispensed. The construction of FIGS. 2 and 3 can be adapted to a range of viscosities. Cap 22 of FIG. 1 is used for the modified container 10' of FIGS. 2-3. Otherwise, the embodiment of FIGS. 2 and 3 may operate in the manner previously explained with reference to FIG. 1. Also, as later described in reference to FIGS. 13-15, the invention dispenser may be designed to dispense a unit dose by squeezing without tilting the bottle or container storing the main body of liquid.

Figure 13:
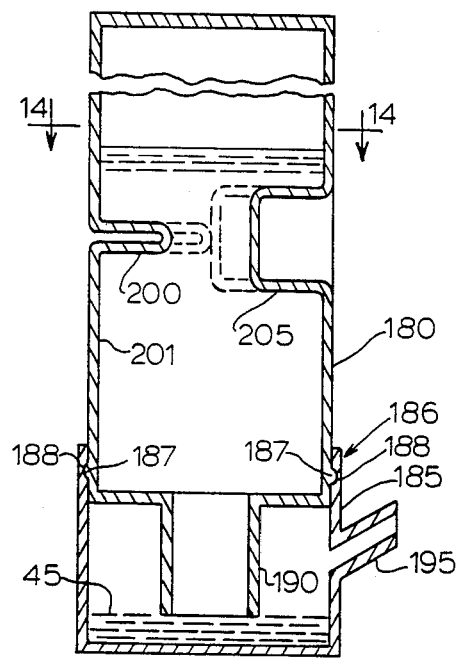
FIG. 13 illustrates in a vertical section view a compressible container of generally rectangular cross section with a comparably shaped snap-fitted cap member and structure for limiting the amount of squeezing to make uniform in quantity the dispensed units of liquid.

FIG. 4 represents a third embodiment employing modified container 10' of FIGS. 2-3 in which the bottle outlet 20' is laterally offset as in FIG. 3 but in this instance a portion of the bottom wall of modified cap 22' is illustrated as being formed with a sloping wall portion 56 to facilitate the complete emptying of the container 10' through the outlet 30', particularly with high viscosity fluids. As with FIGS. 1-3, a substantially liquid and airtight connection is suitably established between the cap 22' and the lower end of container 10' using either the illustrated threaded-type connection as in FIG. 1, a snap-fit-type connection, as illustrated in FIG. 13 with mating snap-fit groove and tongue connections, a press fit between the container and cap as in FIG. 16 or any other suitable means for establishing a substantially liquid and airtight connection whereby the lower, outer end surface or neck of the bottle 10' may be used as a portion of the wall structure forming the chamber.

FIG. 5 illustrates in a fourth embodiment a liquid holding container having a wider and deeper neck 60 forming a stepped bottle outlet 20" on the resilient wall modified container 10" with a correspondingly deeper cap 22". In this embodiment, the air pocket 35" forms around the stepped bottle outlet 20" allowing a substantial body of liquid to collect and be held within neck 60 thus enhancing the range of designs available for temperature compensation. For example, if it is required to arrange for the location of the cap outlet 30" to be at a height suitable, for hand use or if it is desirable to make the base diameter relatively large while maintaining proper positioning of cap outlet 30", the neck 60 can be made larger and longer to maintain only the volume necessary in the air pocket to provide adequate temperature compensation similar to that described with reference to the FIG. 1 dispenser.

In a fifth embodiment shown in FIG. 6, container 10''' has a passageway or container outlet 20''', and a threadably secured cap 22''' formed with a well 65 and a supporting base structure 66. The FIG. 6 dispenser thus provides another structural form particularly suited to emptying all of the contents of the container 10''' by tipping the container when near empty to discharge the contents through the cap outlet 30'''.

Figure 7:
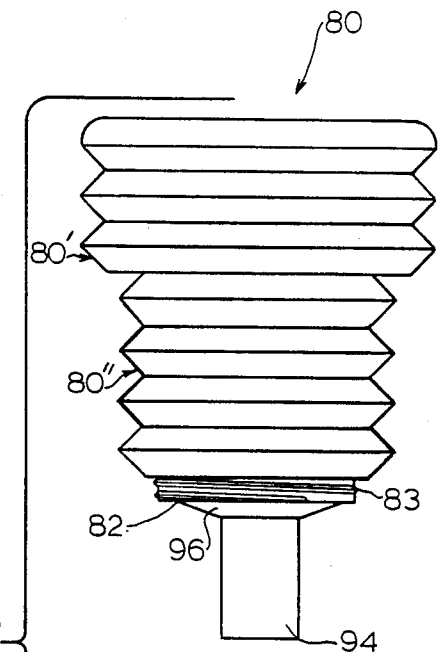
FIG. 7 is an exploded view of a further embodiment showing a generally cylindrical-shaped, bellows-type container and a generally cylindrical-shaped cap and base chamber forming a dispensing structure.
Figure 8:
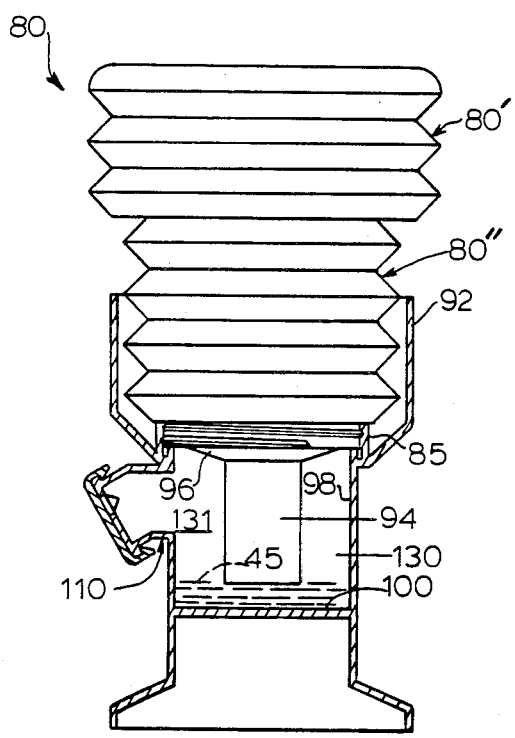
FIG. 8 is a cross-sectional view of the assembled parts shown in FIG. 7
Figure 8A:
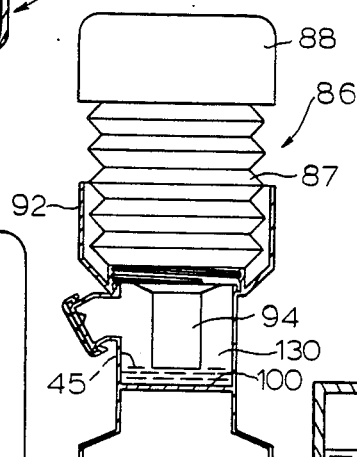
FIG. 8A is a modification thereof.

FIGS. 7, 8 and 8A represent a sixth embodiment similar to all previously-explained embodiments in that the chamber-forming structure utilizes a portion of the lower end of the container wall as well as the outer surface of the container neck or outlet as part of the chamber wall. With particular reference to FIG. 7, a generally cylindrical bellows-type squeeze bottle 80 for holding a body of liquid incorporates a shoulder 82 with threads 83 received in complementary threads 84 of threaded neck 85 of a dispensing cap structure 90. In one embodiment, bottle 80 is blown with a low density plastic which gives relatively slow retraction. This was found desirable to give relatively thick products time to flow back into bottle 80 when released after dispensing. Structure 90 includes an upstanding cylindrical wall 92 for partially covering the lower part 80" of bottle 80 during use for aesthetics reasons. Also, by making the an upper bellows portion 80' of larger diameter than the lower bellows portion 80", wall 92 serves as a stop for limited movement of portion 80' to tend equalize dispensed amounts. (A more positive arrangement will be described with reference to FIG. 8A.) A centrally positioned container outlet or neck 94 extends downwardly from sloping bottom surface 96 of bottle 80 and mounts within a chamber 130 formed when bottle 80 and cap structure 90 are assembled for use as in FIG. 8 by the bottom surface 96 of container 80, the inner side and bottom surfaces 98, 100 of structure 90 and the outer surface of neck 94. An integral base structure 105 supports the overall dispenser-container apparatus in use. A discharge port or outlet 120 is formed by the relatively thin wall material comprising the cap-base structure 90 and includes a downwardly sloping portion 118 leading to discharge outlet 120 adapted also for receiving a guide pin 122 formed on a snap-fitted cap 124.

It will be noted that the dispensing outlet 120 is laterally displaced from the container conduit or neck 94 with air pocket 131 being formed immediately below the container surface 96. Also by making the wall 119, in which outlet 120 is formed, extremely thin, the resistance to flow both during dispensing and suck back is minimal. The operation is substantially the same as previously described. A partial vacuum exists above the main level of liquid in bottle 80. Liquid from the bottle 80 will enter the chamber 130 to a certain level 45 therein. Increase of pressure above the level of liquid in bottle 80, achieved by pressing the of the bottle, will cause the liquid to exit by way of the outlet 120. Release of pressure in the bottle 80 will cause air to draw back through outlet 120 and into chamber 130. This arrangement is particularly useful for a free-standing device in which the user can place a hand immediately below the outlet 120 to receive the liquid being dispensed. Also, the arrangement illustrated in FIGS. 7 and 8 enables the bellows bottle 80 to be made as a single end use disposable item for use with the cap, chamber forming and base member 90 which can be made to be used repeatedly and of relatively rigid, durable material.

FIG. 8A illustrates a modification of the FIG. 8 dispenser in which the container 86 has an upper cylindrical portion 88 and a lower bellows portion 87. Upper portion 88 is preferably non-resilient or stiff relative to portion 87. In operation, portion 88 is intended to strike wall 92 without further container compression so as to enhance obtaining a substantially uniform amount of liquid with each downward stroke of upper portion 88.

Figure 9:
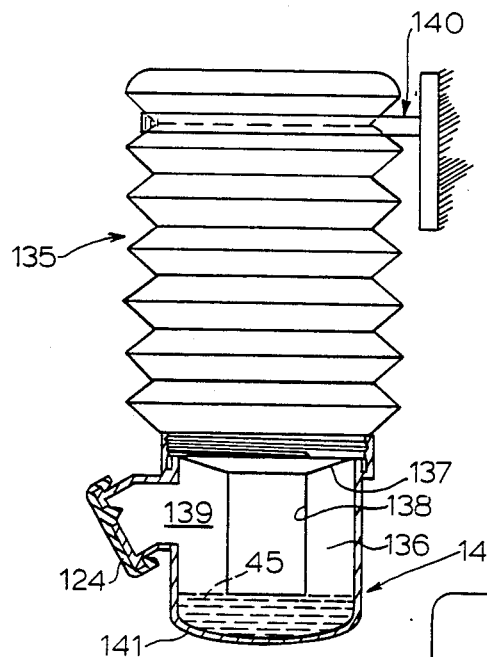
FIG. 9 in a vertical, partially sectioned, side view illustrates a bellows type dispenser similar to that shown in FIGS. 7 and 8 and adapted as a wall-mounted dispenser.

FIG. 9 illustrates a modification of FIG. 8 in which a dispenser bellows container 135 is secured to cap structure 145 and is supported by a bracket 140 secured to a exemplary wall. Dispensing is achieved by pushing up on a suitable, rounded bottom surface 141 to increase pressure in bellows container 135. In this embodiment a chamber 136 containing an air pocket 139 is defined by the lower end surface 137, the outer surface of container outlet 138 and by the inner wall surfaces of cap structure 145. Container 135 and cap structure member 145 are both of a generally cylindrical shape.

Figure 10:
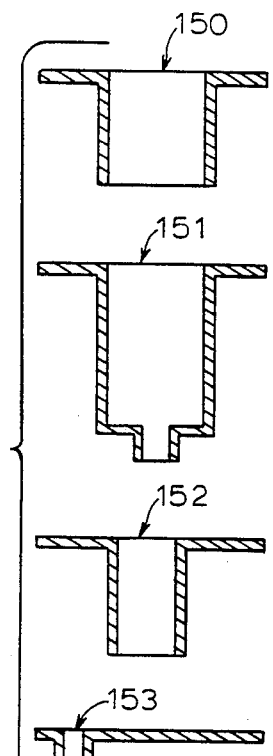
FIG. 10 illustrates a group of separately-formed liquid passageways of different configuration for selective use dependent on the application.
Figure 11:
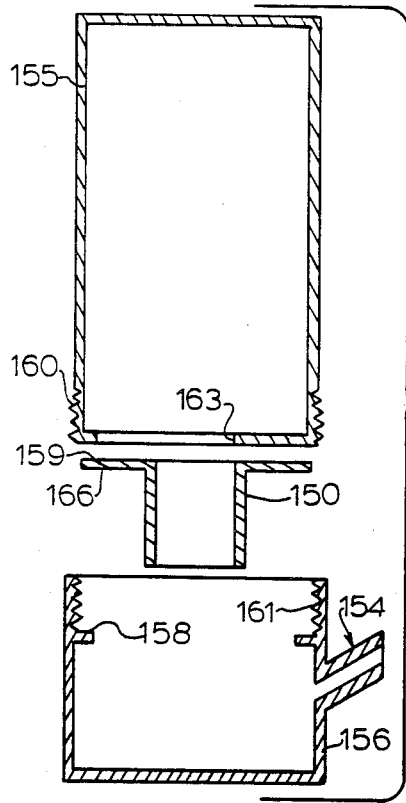
FIG. 11 illustrates in an exploded, vertical section view a dispenser in which a liquid passageway, as illustrated in FIG. 10, is selectable for the application.
Figure 12:
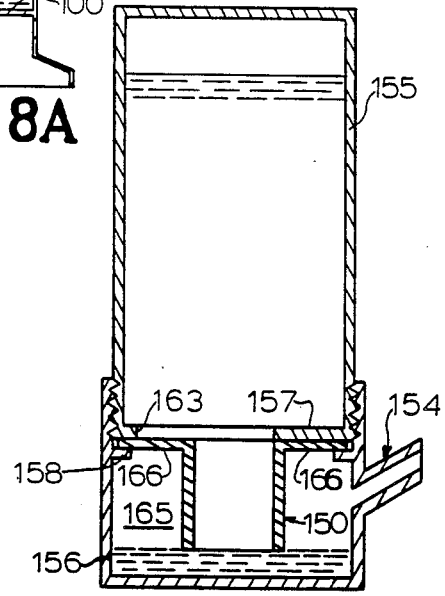
FIG. 12 illustrates the dispenser of FIG. 11 in assembled relation.

FIGS. 10-12 illustrate further embodiments in which a variety of inserts 150, 151, 152 and 153 of different configuration can be selected for use according to the design requirements for liquid viscosity, desired temperature compensation, etc. The selected insert is effectively made part of a modified compressible container 155 by detachable securement of a cap structure 156 as further illustrated in FIGS. 11 and 12 utilizing the mating threads 160, 161 to establish a liquid-tight connection. In FIGS. 11-12, it is assumed that insert 151 has been selected as best suited to the application. As further illustrated, it will be seen that the modified cap structure 156 includes an internal peripheral ledge 158 below a upper end of the cap on which the flange portion 159 of selected insert 151 rests and is held in clamped relation as best seen in FIG. 12 between bottom wall 157 and ledge 158. An opening 163 in the bottom wall 157 is located and of sufficient size to accommodate any of the inserts 151-153 even though of different configuration. Once assembled as in FIG. 12, container 155 and the selected insert such as the insert 151 used in FIGS. 11-12 forms an integral container, container-outlet and cap structure. As with prior described embodiments, the cap structure 156 in conjunction with the assembled container 155 and its selected insert 150, 151, 152 or 153 forms the required air pocket 165 utilizing the bottom surface, e.g., surface 166, of the selected insert, the inner surfaces of cap structure 156 and the outer surfaces of the insert, e.g. insert 150, within cap structure 156. Squeezing of the flexible container 155 causes the desired amount of liquid to discharge through a cap outlet 154 in the manner previously explained.

Figure 14:
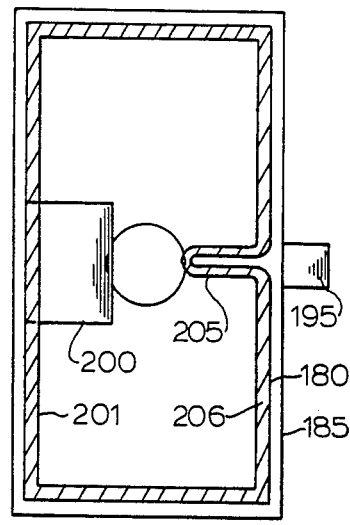
FIG. 14 is a section view taken on line 14—14 of FIG. 13.
Figure 15:
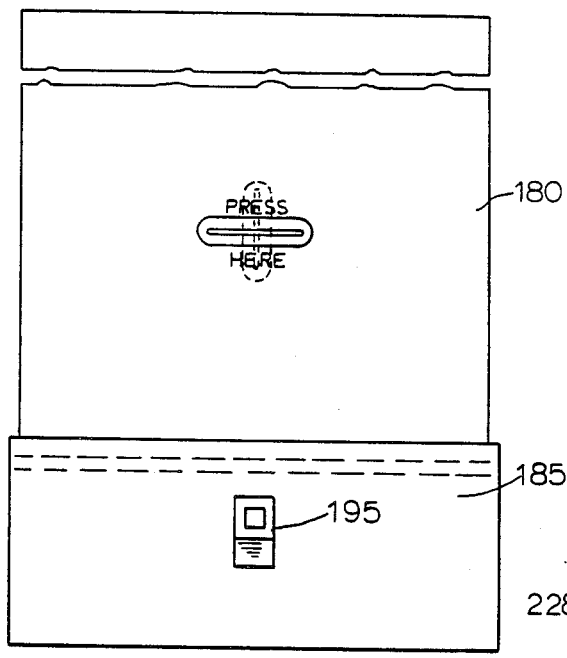
FIG. 15 is a side view of the container-cap dispenser of FIG. 13.

FIGS. 13-15 illustrate the container of the invention modified for dispensing a unit quantity. Making specific reference to FIGS. 13-15, a modified flexible container 180 is generally of rectangular cross section and receives a cap structure 185 by means of a liquid tight snap-fit connection 186 established by a molded rib 187 on the lower end of container 180 snap fitted in a molded groove 188 on the upper inside wall portion of cap structure 185. Container 180 includes liquid passageway 190 and cap structure 185 includes dispensing outlet 195 the functions of which will be readily understood from prior description. Container 180 is molded with an inwardly protruding generally horizontal folded ledge portion 200 protruding from side wall 201 and an inwardly protruding generally vertical folded ledge portion 205 protruding from side wall 206. A suitable legend such as "Press Here" is embossed on the outside of both sidewalls 201 and 206 as seen in FIG. 13. The sides of conventional squeeze bottles can, course, be squeezed together and the maxium squeeze is, of, obtained when the sides are fully pressed together. The amount of squeeze of the conventional squeeze bottle thus tends to be non-uniform from squeeze to squeeze. By comparison and as will be readily understood particularly from FIG. 13, when walls 201 and 206 are simultaneously pressed inwardly by squeezing, ledge 200 strikes ledge 205 and thus limits the amount of squeezing to some predetermined squeeze stroke the effect of which is to make substantially uniform the amount of squeeze and the amounts of liquid dispensed through the cap member outlet 195. Thus, a unit dose dispenser is provided and which is particularly advantageous when associated with the unique cap dispensing structure of the invention.

Figure 16:
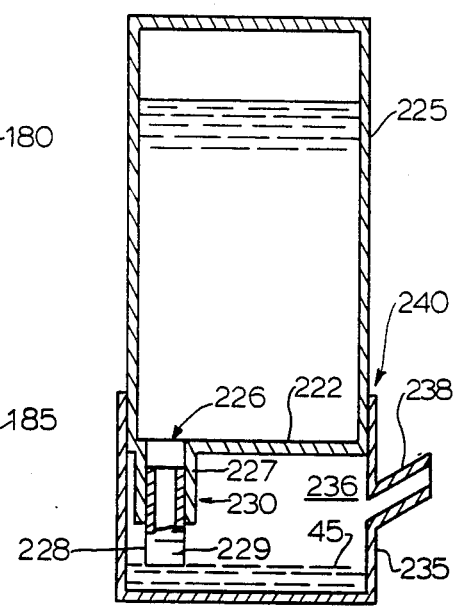
FIG. 16 is a view similar to FIG. 2 but with the container outlet adjustable and the cap member adjustably slip fitted to the container.

As a further aspect of the invention, FIG. 16 illustrates a generally cylindrical squeeze type container or bottle 225 having a laterally-offset opening 226 in bottom wall 222 leading to a male portion 227 of a container outlet assembly 230 also having a slidable female portion 228 suitably graduated with index marks 229. Thus, by suitable vertical adjustment of the female portion 228, the overall depth of container outlet 230 can be made to correspond with some desired temperature compensation and/or liquid viscosity characteristic and may be used for unit dose dispensing as previously described for the dispenser of FIGS. 2 and 3. Cap structure 235 is slidably press-fitted at 240 to the lower end of bottle 225. The adjustable positioning of cap structure 235 on bottle 225 thus provides means for adjustment of the size of the air pocket 236 to control the amount of liquid dispensed through cap member outlet 238 with a particular amount of squeezing as well as to control the temperature compensation established for the established size of air pocket 236.

While various embodiments have been described, it will be appreciated by those skilled in the art that various modifications may be made without departing from the scope of the invention. While not shown, it should also be understood that a conventional flip-type valve could be employed as the cap outlet rather than the type cap outlet illustrated as, for example, with food, volatile products, caustic products, and the like. In all applications, the cap outlet should be sized to create low back pressure, i.e., resistance to flow, so as to minimize the required amount of compression on the bottle during dispensing. The invention is uniquely adapted to exhibit such low back pressure since the cap outlet can be readily designed to fit the application and the liquid viscosity.

What is claimed is:

1. A liquid dispenser comprising:
   resiliently deformable container means including a main body having at least one side wall extending longitudinally; a transversely extending bottom wall means defining an opening, the opening being the only access into the container means and the wall means having a downwardly facing outer wall surface extending between the opening and said side wall of the main body; and a neck extending longitudinally and downwardly from the opening and having a transverse cross-sectional area substantially smaller than the area of the bottom wall means surrounding the neck, and defining at its lower end an opening;
   an inverted cap structure having at least one longitudinally extending side wall, a transversely extending bottom wall below said neck opening, and an outlet in the side wall above said opening; the cap structure side wall at its upper extremity cooperating with the side wall of the main body to form a liquid tight-seal; and
   a temperature compensated air pocket defined by liquid contained in the inverted cap, the outer surface of the neck, the inner surface of the side wall of the cap structure, and said outer wall surface of the bottom wall means whereby in use, temperature driven changes in a volume of air above liquid in the main body of the container means results in movement of the level of the liquid in the cap, the air pocket being proportioned relative to the container means to accommodate such changes in level below the outlet for a pre-selected range of temperatures so that there is no discharge at the outlet caused by such changes in the volume of air above the liquid.

2. A liquid dispenser as claimed in claim 1 in which the cap structure further includes a base structure attached to the bottom wall for standing the dispenser on a level surface.

3. A liquid dispenser as claimed in claim 1 in which the liquid-tight seal is a threaded connection.

4. A liquid dispenser as claimed in claim 1 in which the neck is positioned nearer to the cap structure side wall remote from the outlet than to the outlet.

5. A liquid dispenser as claimed in claim 4 in which a portion of the bottom wall of the cap structure near the outlet is sloped upwardly to the outlet to facilitate pouring out the last of the liquid from the dispenser.

6. A liquid dispenser as claimed in claim 1 in which the bottom wall of the cap structure includes a first portion below the neck and a surrounding portion elevated with respect to the first portion, so that the liquid in the cap is contained essentially above the first portion only.

7. A liquid dispenser as claimed in claim 1 in which the main body of the container means and the neck are separate parts, and in which the dispenser further comprises means coupling the neck to the main body.

8. A liquid dispenser as claimed in claim 1 in which said liquid-tight seal is a snap-fit connection between the cap structure side wall and the main body side wall.

9. A liquid dispenser as claimed in claim 1 in which said neck is of adjustable length.

10. A liquid dispenser as claimed in claim 1 in which said main body includes a resiliently deformable bellows portion for compression longitudinally to dispense the liquid.

11. A liquid dispenser as claimed in claim 10 and further comprising means for suspending the dispenser from a wall, such means being coupled to the dispenser at the bellows portion.

12. A liquid dispenser as claimed in claim 10 and further comprising limit means to control the longitudinal compression of the bellows portion for repetitive dispensing of a pre-determined volume of the liquid.

* * * * *